Oct. 22, 1968  R. C. WILLIAMS  3,406,641
RAILWAY CAR CENTER PLATE AND AUXILIARY BEARINGS
Filed March 4, 1966  2 Sheets-Sheet 1
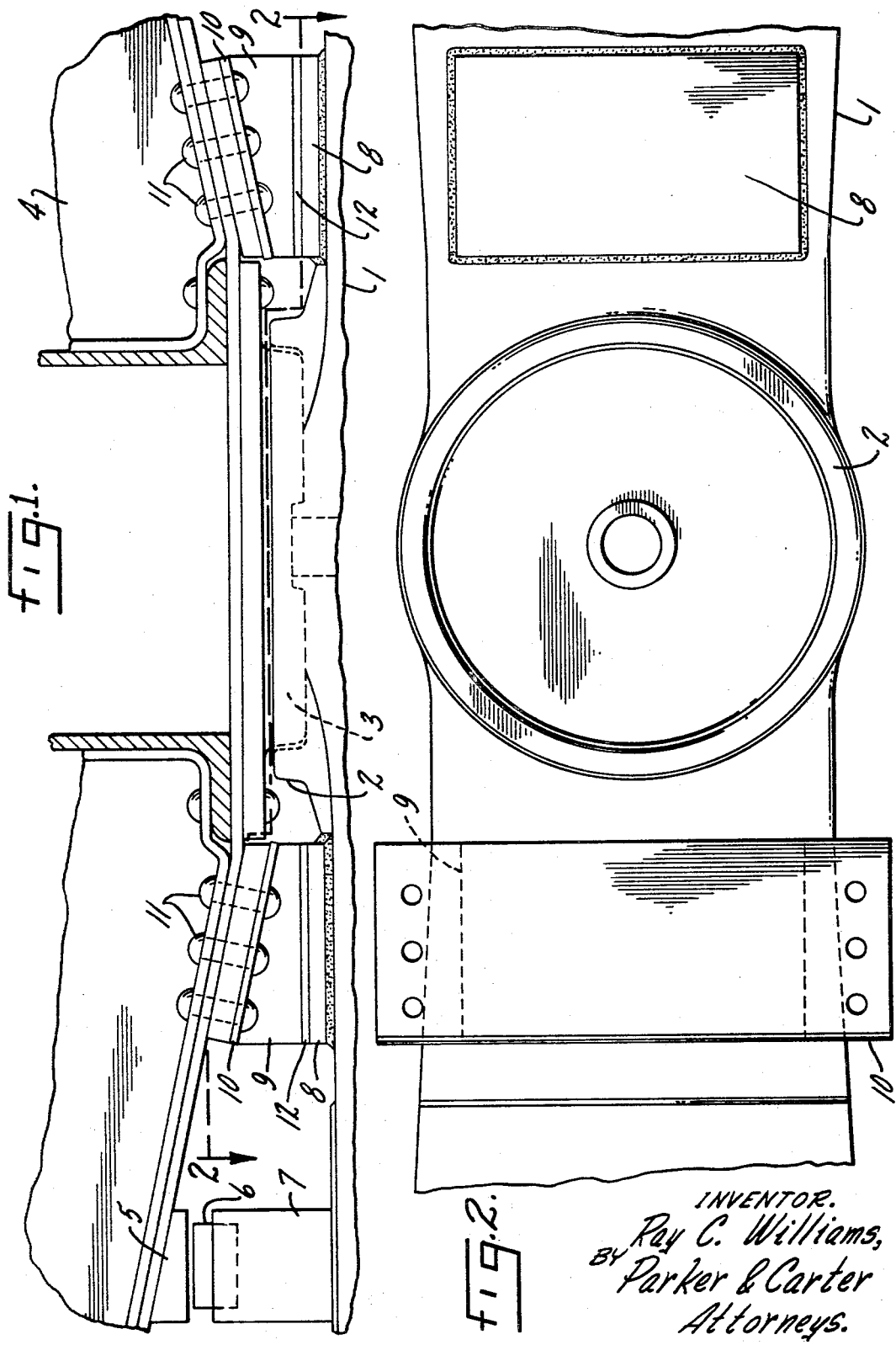
INVENTOR.
Ray C. Williams,
BY Parker & Carter
Attorneys.

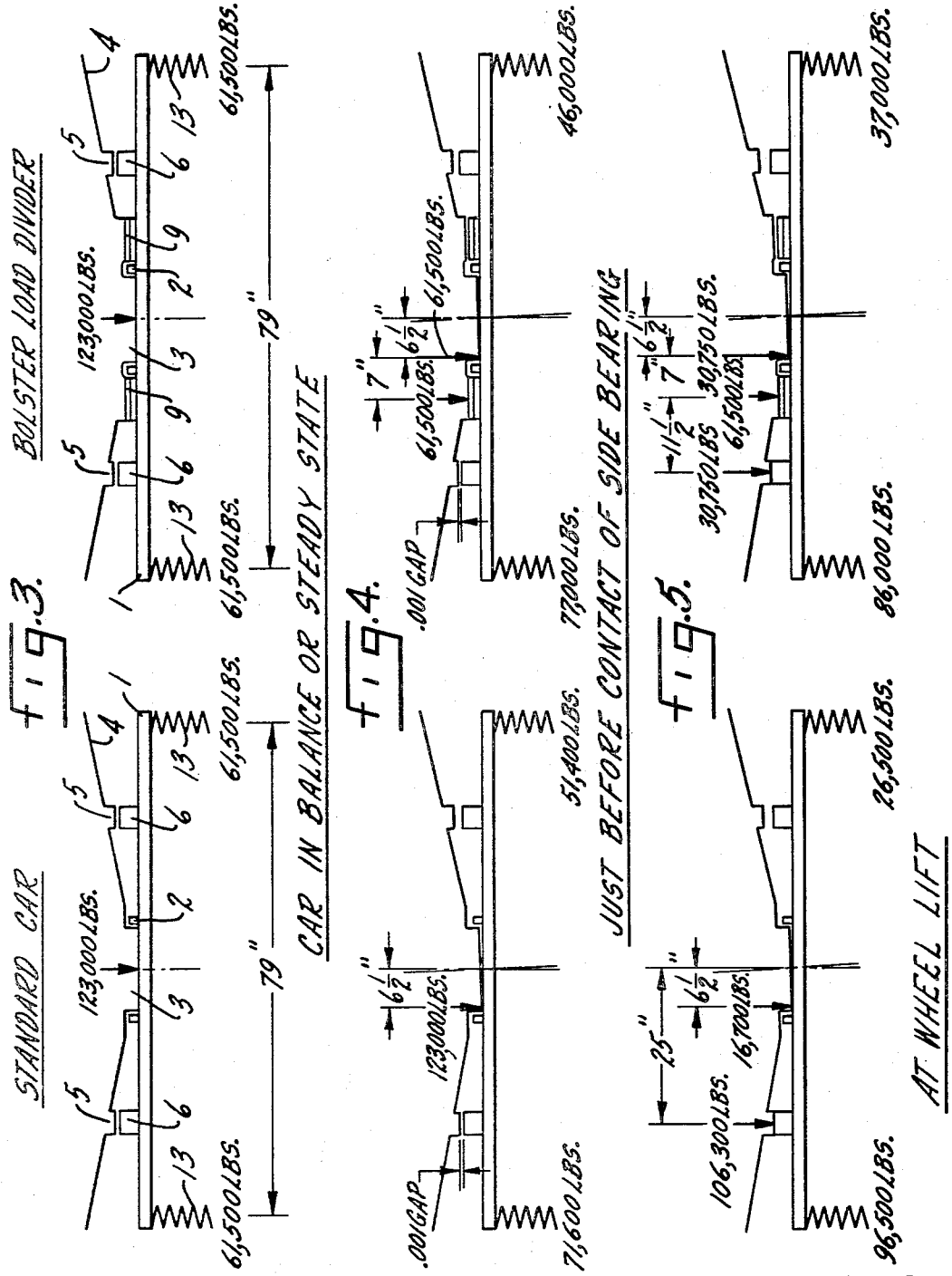

United States Patent Office 3,406,641
Patented Oct. 22, 1968

3,406,641
RAILWAY CAR CENTER PLATE AND
AUXILIARY BEARINGS
Ray C. Williams, Chicago, Ill., assignor to Standard Car
Truck Company, Chicago, Ill., a corporation of New
Jersey
Filed Mar. 4, 1966, Ser. No. 531,683
10 Claims. (Cl. 105—199)

ABSTRACT OF THE DISCLOSURE

Means for increasing the relative proportion of the load carried by the heavyside of a railroad car truck as the car tilts toward the point of high side wheel lift which includes cushions between the truck center plates and the side bearings. The cushion on the low or heavyside of the truck being adapted to carry up to approximately one-half of the car load as the car tilts toward the heavyside until the side bearing positively arrests the rocking of the car with respect to the truck at which time the load carried by the cushion on the heavyside equals approximately half of the car load, the remainder of the car load being generally evenly divided between the side bearing and the center plates.

---

This invention involves a railroad car stabilizer and has for one object to provide a bolster load divider for railroad cars effective to minimize rocking of the car about a horizontal axis and to inhibit shimmying of the car truck about a vertical axis.

Railroad cars are supported on wheeled trucks, each including a truck bolster. A bolster supporting the car is balanced in equilibrium on, and the truck is free to pivot on, a horizontally disposed center plate between the bolsters. As the car travels, it rocks upon the center plate about a horizontal axis generally parallel to the car. Side bearings are interposed between the bolsters outside of the center frame to limit such rocking and since the truck must pivot with respect to the car as it travels about curves, switches and the like, clearance is provided between the opposed side bearings.

As the car rocks, inertia forces sometimes great enough to cause the car to tip over may develop before contact of the side bearings. To minimize the effect of such inertia forces means are provided between the center plate and the side bearings effective before the side bearings are contacted to resist rocking and to better distribute the load on both sides of the truck.

Cars may tip over independent of the above inertia forces if displacement of the center of gravity reduces the load on the right side of the truck to a point insufficient to hold the wheels on the track. One object of this invention is therefore to provide bolster load dividing means which will, as rocking takes place, decrease the relative load on the heavy side and increase the relative load on the light side so as to hold the light side wheels on the rail.

Another object is to provide damping means to prevent a build-up of momentum in the car body due to resonance of the spring suspension system with the frequency of applied forces due to track conditions. The natural frequency of the elastic bolster load dividing means being very appreciably higher than the natural frequency of the spring suspension system, makes it possible for the load dividing means to resist rocking of the car body, thus inhibiting a build up of inertial forces which add to those forces tending to tip the car off the track.

The above result is obtained by placing between the side bearings and the center plate a cushion of high compressive rate carried by one of the bolsters and engaged by a member on the other. Rocking of the car with resultant transfer of the load from the center to the side of the center plate simultaneously builds up pressure with a minimum of movement in the cushion and this build-up with a minimum of movement continues until the side bearing is contacted.

When the car tilts, the point of application at which the load is applied to the truck center plate shifts from the center in the direction of tilt. The distance from the center at which load is applied to the cushion is greater than the distance from the center at which the load is applied to the center plate and finally when tilting puts a load on the side bearing, the distance from the center at which that load is applied is greater than either of the previous distances. Thus there are three different points of application of the load to the truck bolster, the center plate, the cushion, and the side bearing.

The truck bolster is essentially a beam, carrying loads imposed by it to the springs on either end in accordance with the well known beam formula. Computation of these loads and distances will show that the presence of the intermediate cushion effectively increases the relative proportion of the total load applied to the high side. A consideration of the elastic resistance of the cushion will show that it substantially inhibits the build-up of dynamic forces.

The preferred cushion takes the form of a steel and rubber sandwich which of course is a very stiff spring having a very high compression rate.

The invention is illustrated more or less diagrammatically in the accompanying drawings, wherein:

FIGURE 1 is a diagrammatic section through a railroad car with parts omitted and parts in elevation;

FIGURE 2 is a section along the line 2—2 of FIGURE 1;

FIGURE 3 is a comparative load diagram of a standard car on the left and a bolster load divider car on the right in balanced or steady state;

FIGURE 4 shows similar diagrams just before contact of the side bearing;

FIGURE 5 shows similar diagrams at wheel life of a standard car.

Like parts are indicated by like numerals throughout the specification and drawings.

The truck bolster 1 is supported at both ends on the truck frame in the usual manner. It supports a female center plate 2 which rotatably receives a male center plate 3 depending from the car bolster 4. Extending downwardly from the bolster 4 is a side bearing member 5 in opposition to but normally out of contact with anti-friction side bearing rollers 6 in supports 7 on the truck bolster 1.

Clearance between the side bearing plates and rollers permits limited rocking of the car about a horizontal axis before contact of the side bearing. The presence of the roller prevents locking of the truck against angular movement about a vertical axis passing through the center plates.

Fixed on and projecting upwardly from the truck bolster 1 immediately adjacent and on opposite sides of the center plate are bearing or sliding load supporting plates 8 of metal or other suitable bearing material having preferably plane horizontal bearing surfaces in the same plane perpendicular to the axis of the center plates though if desired, these bearing surfaces might be inwardly or outwardly inclined and might be of planar or conic section. Carried by and attached to the car bolster 4 are cushion pads 9 increasing outwardly in thickness as indicated. These pads are of rubber or other high compressible elastomeric material. As indicated the pads are sandwiches having a metal plate 10 riveted or bolted at 11 to the bolster and provided on their lower surfaces with bearing or load supporting, sliding plates 12 which conform to and are in contact with the bearing plates 8. The pressure applied on both sides of the car to hold these bearing plates together is a very small proportion of the load of the car. Contact of these plates is of importance first because in order to obtain the desired load divider effect any tilting of the car must immediately increase the pressure on the pad and the bearing members on the down side and because friction contact between the pads tends to minimize shimmy, the pads acting in a sense as shock absorbers inhibit shimmy action of the truck. The very slightest rocking of the car increases pressure between the two plates on the low side so that as the car continues to rock, the yielding of the pad being very small, some of the load is transferred from the outer periphery of the tilted center plate to the pad and this transference continues with an increased proportion of the load carried by the pad and a lesser portion carried by the center plate up to the time that the car is tilted enough to bring the side bearings into play.

Referring to the load diagrams, FIGURES 3, 4 and 5, the springs on both sides of the truck supporting the opposite ends of the truck bolster are shown diagrammatically. The cushion and associated parts and the side bearings are shown rather diagrammatically.

These load diagrams show only static forces, or loads, at three specified situations. During progressive tipping of the car body, as indicated in FIGURES 4 and 5, it is obvious that there is a build-up of dynamic forces. FIGURE 5 shows a static condition for the standard car wherein the inertial forces are of sufficient magnitude to tip the car over (lift the wheels on the light side), while under this same condition, the inertial forces of the car equipped with bolster load divider are appreciably less, the static load on the light side is greater and the car will not tip over.

In FIGURE 3, the standard car and the bolster load divider car both apply 123,000 pounds through the center plates to the truck bolster so that the springs on both sides carry 61,500 pounds, the loads carried by both the cushions being equal and slight, may be ignored.

In FIGURE 4, as the standard car tilts to the left, the entire load is applied to the left hand side of the right center plate through a lever arm of six and one-half inches, the effective radius of the center plate. Thus the left hand spring carries 71,600 pounds. The spring on the right hand or high side of the truck carries 51,400 pounds, adequate to keep both the right hand wheels on the track.

In FIGURE 4 the load divider car has tilted toward but has not yet reached side bearing contact. The gap between the side bearings for example may be .001 inch. The cushion 9 has picked up part of the load. The center plate has a six and one-half inch effective radius and the center of the cushion is thirteen and one-half inches from the center. Half the load 61,500 pounds is applied at the six and one-half inch lever arm and half the load, 61,500 pounds is applied at the thirteen and one-half inch lever arm but because of the different points of application of the load, the left-hand or low-side wheels carry 77,000 pounds and the right-hand or high-side wheels carry 46,000 pounds. This, while somewhat less than the load carried by the high-side wheels in the standard car just before point of impact of the side bearings, is ample to keep the wheels on the track. The reason why the load on the high-side wheels is somewhat less than in the case of the standard car is that one-half the load is now applied to the truck through the thirteen and one-half inch lever whereas in the standard car, the entire load is applied through the six and one-half inch lever.

In FIGURE 5, 16,700 pounds of load are applied to the heavy side of the standard car center plate through the six and one-half inch lever and 106,300 pounds are applied to the side bearing through the twenty-five inch lever, the load of 26,500 pounds now carried by the light side or right-hand wheels is too small to prevent wheel lift.

With the bolster load divider, the load is applied at three different points to the truck. 30,750 pounds is carried by the left hand side of the center plate through the six and one-half inch lever, the load of 61,500 pounds is carried by the cushion through the thirteen and one-half inch lever and the load of 30,750 pounds is carried by the side bearing through the twenty-five inch lever. The result is that the wheels on the heavy side carry 86,000 pounds and the wheels on the light side carry 37,000 pounds, sufficient to keep the wheels on the track.

The loads shown in the diagram are arbitrarily selected, chosen to indicate clearly the load distribution during rocking of the car body.

Actually the 122,000 pound load is the maximum allowable body load of a 100 ton capacity car. Normal body bolster diameter for a 100 ton car is thirteen and seven-eighths inches and seven-sixteenths corner radius. A selection of different values on the basis of different car designs will disclose the same relationship. It is the dividing of the load between the center plate, the cushion and finally between the center plate, the cushion and the side bearing so that the cushion yields at such a rate that load continues to be applied to the center plate throughout the entire cycle which makes possible the desired stabilizing of the car and also minimizes shimmying of the truck. The small displacement as the load is applied to the cushion is the heart of the situation. The center plate is substantially uncompressible. The side bearing is substantially uncompressible but the cushion is compressible to the extent that pressures very quickly build up with minimum displacement so that load is carried first by the center plate and the cushion and then by the center plate, the cushion and the side bearing.

Another advantage to this situation is that the cushion provides resistance to tilt throughout the entire arc of tilt, thus inhibiting or minimizing inertia effects whereas when only the side bearings are present, they go into effect only after inertia forces have developed.

The load divider pad increasing in thickness as it does outwardly, has the effect of equalizing the pressure on the pad during car tilt. This insures that the center of force on the truck bolster is located substantially at the center of the bearing area so that tilting of the car with the very slight decrease in thickness of the pad does not produce any appreciable change in the points of application of the various loads. The center plates preferably have mating horizontal surfaces so when the car tilts, the load is instantly applied at the outer side of the center plate. The side bearings are of rigid material so that as soon as contact is made, the distance between such contact and the center of the center plate is fixed. Since the peculiar shape of the load dividing pad is such as to maintain the center of load constant, all three points of application remain at the same radius from the center of the center plate.

It will, of course, happen that the center of gravity of the car load may not be exactly on the vertical axis of the center plates but experience teaches that such displacement is negligible in connection with the ultimate effect of the load divider.

I claim:

1. A support for a railroad car on a railroad car truck, which includes a rigid plane load supporting center plate between the car and truck, on which the car may rotate about a vertical axis, the center plate being the main load supporting means between the car and the truck when the car is upright, rigid side bearings between opposed sides of the car and the truck, normally inactive while the car is upright and adapted positively to limit rocking of the car on the center plate about a horizontal longitudinal axis, cushions each having a high compression rate, interposed between the car and truck adjacent to the center plate and between it and the side bearings, sliding load supporting plates on car and truck held in contact by the cushions when the car is upright, each cushion being adapted to yield as the car tilts toward it at such a rate that the load carried thereby increases proportionally as the load carried by the center plate decreases, up to the time at which the side bearing positively arrests the tilting motion of the car with respect to the truck.

2. The device of claim 1 characterized by the fact that the center plate has a generally circular load carrying area, the load carried thereby being adapted to shift away from the center of the plate toward its outer periphery as the car tilts.

3. The device of claim 1 characterized by the fact that the sliding plates are held in frictional contact with one another while the car is upright and provide means for inhibiting truck shimmy.

4. The device of claim 1 characterized by the fact that the sliding plates are generally perpendicular to the vertical axis of rotation of the car on the center plate.

5. The device of claim 1 characterized by the fact that the distance between the vertical axis of the center plate and the center of load on the sliding plate remains constant as the car tilts toward the side bearing.

6. The device of claim 1 characterized by the fact that the cushions increase in thickness outwardly from the center plate.

7. The device of claim 1 characterized by the fact that at least one pair of sliding plates remain in contact with one another between the car and truck independent of relative angular movement of car and truck about both vertical and horizontal axes.

8. The device of claim 1 characterized by the fact that a substantial portion of the load is carried by the center plate up to the time at which the side bearing arrests rocking motion of the car with respect to the truck.

9. The device of claim 1 characterized by the fact that as the car tilts and the center plate rocks, the car load will be divided between the heavyside of the center plate and the cushion on the heavyside until the side bearing positively arrests the rocking of the car when the loads carried by the center plate and the side bearing are equal and the load carried by the cushion on the heavyside is equal to the sum of the loads carried by the center plate and the side bearing.

10. A load divider support for railroad cars including a rigid load supporting center plate, rigid side bearings spaced radially from opposite sides of the center plate, a cushion between the center plate and each side bearing, load carrying plates associated with the center plate and both cushions when the car is upright, the cushion on one side being adapted to yield as the car rocks toward it to gradually assume an increasing proportion of the load as the proportion carried by the center plate decreases up to the point at which the load is distributed between the center plate, said cushion and the side bearing nearest to it.

References Cited

UNITED STATES PATENTS

| | | | |
|---|---|---|---|
| 480,830 | 8/1892 | Resley | 105—200 |
| 1,094,708 | 4/1914 | Fant | 105—200 |
| 1,079,318 | 11/1913 | Stevens | 105—200 |
| 1,993,104 | 3/1935 | Lamont | 105—200 |
| 2,350,301 | 5/1914 | Cottrell | 308—138 |
| 2,547,852 | 4/1951 | Bryan | 308—138 |
| 2,698,208 | 12/1954 | Dilg | 308—138 |
| 3,045,998 | 7/1962 | Hirst | 267—3 |
| 3,255,712 | 7/1966 | Barber | 105—99 |

ARTHUR L. LA POINT, *Primary Examiner.*

H. BELTRAN, *Assistant Examiner.*